No. 660,615. Patented Oct. 30, 1900.
M. BAUER.
LUGGAGE CARRIER FOR BICYCLES, &c.
(Application filed May 28, 1900.)
(No Model.)
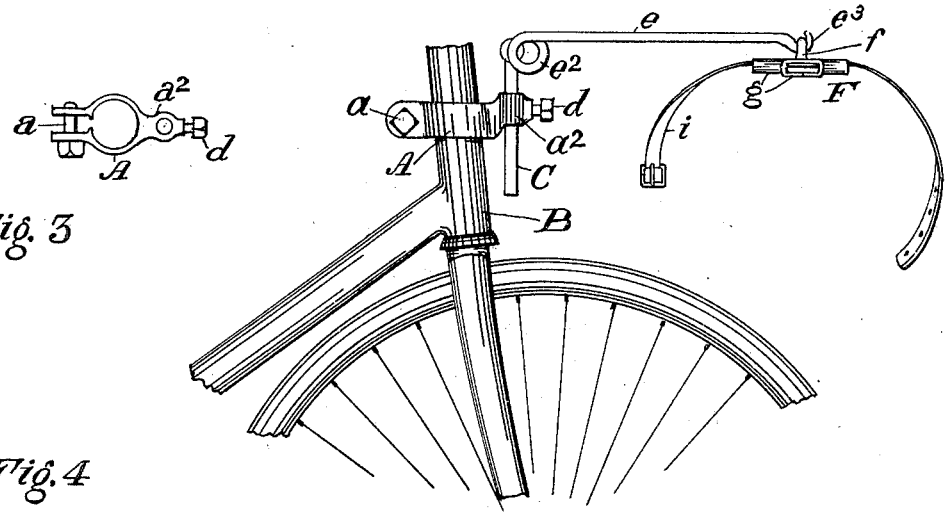
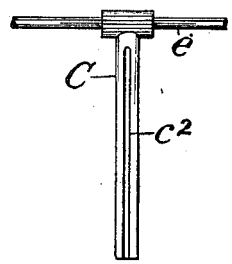
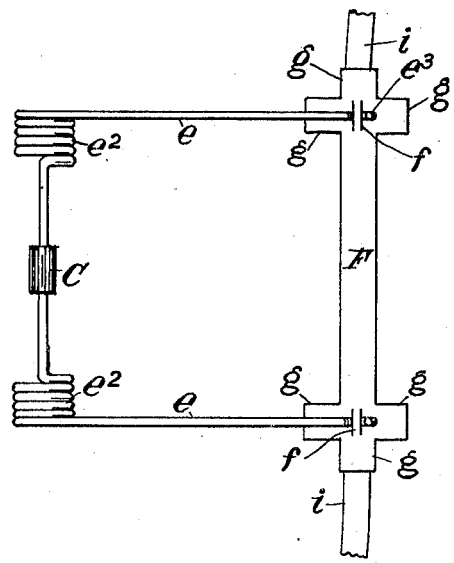
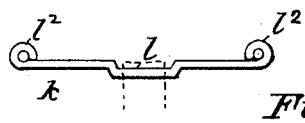
Witnesses
L. R. Vorce.
S. C. Prentiss.
Martin Bauer, Inventor,
By his Attorney

UNITED STATES PATENT OFFICE.

MARTIN BAUER, OF CLEVELAND, OHIO.

LUGGAGE-CARRIER FOR BICYCLES, &c.

SPECIFICATION forming part of Letters Patent No. 660,615, dated October 30, 1900.

Application filed May 28, 1900. Serial No. 18,205. (No model.)

*To all whom it may concern:*

Be it known that I, MARTIN BAUER, a citizen of the United States, residing at Cleveland, in the county of Cuyahoga and State of Ohio, have invented certain new and useful Improvements in Luggage-Carriers for Bicycles, &c.; and I do hereby declare the following to be a full, clear, and exact description of the invention, such as will enable others skilled in the art to which it appertains to make and use the same.

My invention relates to attachments to bicycles and like vehicles for carrying bundles or luggage of any kind, and particularly such as are fragile or liable to injury from the jarring to which articles tied or otherwise attached to an ordinary bicycle are subjected.

The object of my invention is to provide an attachment by which injury to the articles carried may be avoided and objects of diverse shape and size be held without inconvenience to the rider or risk of injury; and my invention consists in the construction and combination of parts designed to permit the aforesaid object to be attained, as hereinafter fully described, and specifically pointed out in the claims.

In the drawings, Figure 1 is a side view in elevation, showing my device attached to the head of a bicycle. Fig. 2 is a plan view thereof. Fig. 3 is a detached view of the clamp A; Fig. 4, a detached view of the stem C, and Fig. 5 shows a special form of holder.

A represents a clamp, which may be of any suitable or preferred construction, capable of being securely fixed to the frame B of a bicycle. I have shown the clamp in Fig. 1 attached to the head of the bicycle, but it could be attached to the stem of the handle-bars or to the saddle-post or back brace, if preferred. The clamp A is attached to the frame by suitable means, such as the screw-bolt $a$, and has a lug $a^2$, through which passes a vertically-adjustable stem C, held in place by a set-screw $d$, the stem C being preferably flattened or grooved on one side, as at $c^2$, Fig. 4, to prevent its turning to either side.

The stem C is preferably formed of malleable casting, in which is pivotally secured the inner straight portion of the arm $e$ between the coils $e^2$, while the outer ends of the arms $e\,e$ terminate in hooks $e^3$ and are continuous with the coils $e^2$, whereby the arms $e\,e$, which are themselves more or less springy, are given any desired degree of resiliency, according to the load they are intended to support, and are, besides, laterally resilient, so that by spacing the attachment of the bundle of the hooks $e^3$ a trifle nearer together than the normal distance of the arms $e$ from each other the lateral spring of the arms causes the package to be held more securely and prevents its shaking or rattling. The arms $e$ and coils $e^2$ are preferably formed of stout wire and all in one piece, the central straight portion being inserted in a groove cast in the transverse head of the stem C and the edges of the groove closed over it, so as to hold it in place. The arms $e$ and coils $e^2$ could obviously be formed from plate or sheet metal; but it is not considered desirable.

The bundle may be affixed to or hung upon the arms $e\,e$; but preferably a holder F, having eyes or loops $f$ and tubular or other guides or eyes $g\,g$, through which straps or cords may be passed, is detachably suspended from the hooked ends of the arms $e\,e$, and to this holder the bundle or luggage is secured by means of cords or straps $i$, which pass through the guides $g\,g$ of the holder. The holder F being detachable can be affixed to the bundle and then hung upon the arms $e$, which is very much more convenient than to secure a parcel to a carrier already affixed to the bicycle. In addition to this, any special form of holder which may be best adapted to any particular form of package which one may habitually carry can be provided and attached to the arms $e\,e$. An example of this is shown in Fig. 6, in which $k$ represents a holder especially designed to receive and hold a basket, being provided with a notch $l$ to receive the handle of the basket, as shown in dotted lines, and with eyes $l^2$ to engage the hooks of the arms $e\,e$. Other special holders may be made in a similar manner.

When the bundle-carrier is not needed, the stem C and other parts connected therewith may be removed by loosening the screw $d$, leaving only the inconspicuous clamp A attached to the bicycle. By the vertical adjustment of the stem C room for bundles of varying sizes is obtained, and the whole apparatus is exceptionally light and neat.

By folding the arms e backward along the stem C, after the latter is removed from the clamp A, the carrier can easily be put in the pocket and be ready at all times to be attached to the bicycle when needed.

What I claim is—

1. In a luggage-carrier for bicycles the combination of the clamp secured to the bicycle, a stem vertically adjustable in said clamp, a rod or wire passing transversely through the stem and having at its extremities coils which terminate in forward-extending arms terminating in hooks, and a holder having eyes to engage said hooks and guides for the straps or cords by which the bundle is secured thereto, substantially as described.

2. In a luggage-carrier for bicycles the combination of a clamp secured to the bicycle, a detachable stem vertically adjustable in said clamp, a rod or wire passing transversely through the stem pivotally and having at its extremities coils which terminate in forward-projecting arms provided terminally with hooks, and a holder provided with eyes for engaging said hooks and with guides for receiving the cords or straps by which the bundle is secured thereto, substantially as described.

In testimony whereof I hereto affix my signature in presence of two witnesses.

MARTIN BAUER.

Witnesses:
W. E. MORROW,
N. J. WILLS.